UNITED STATES PATENT OFFICE.

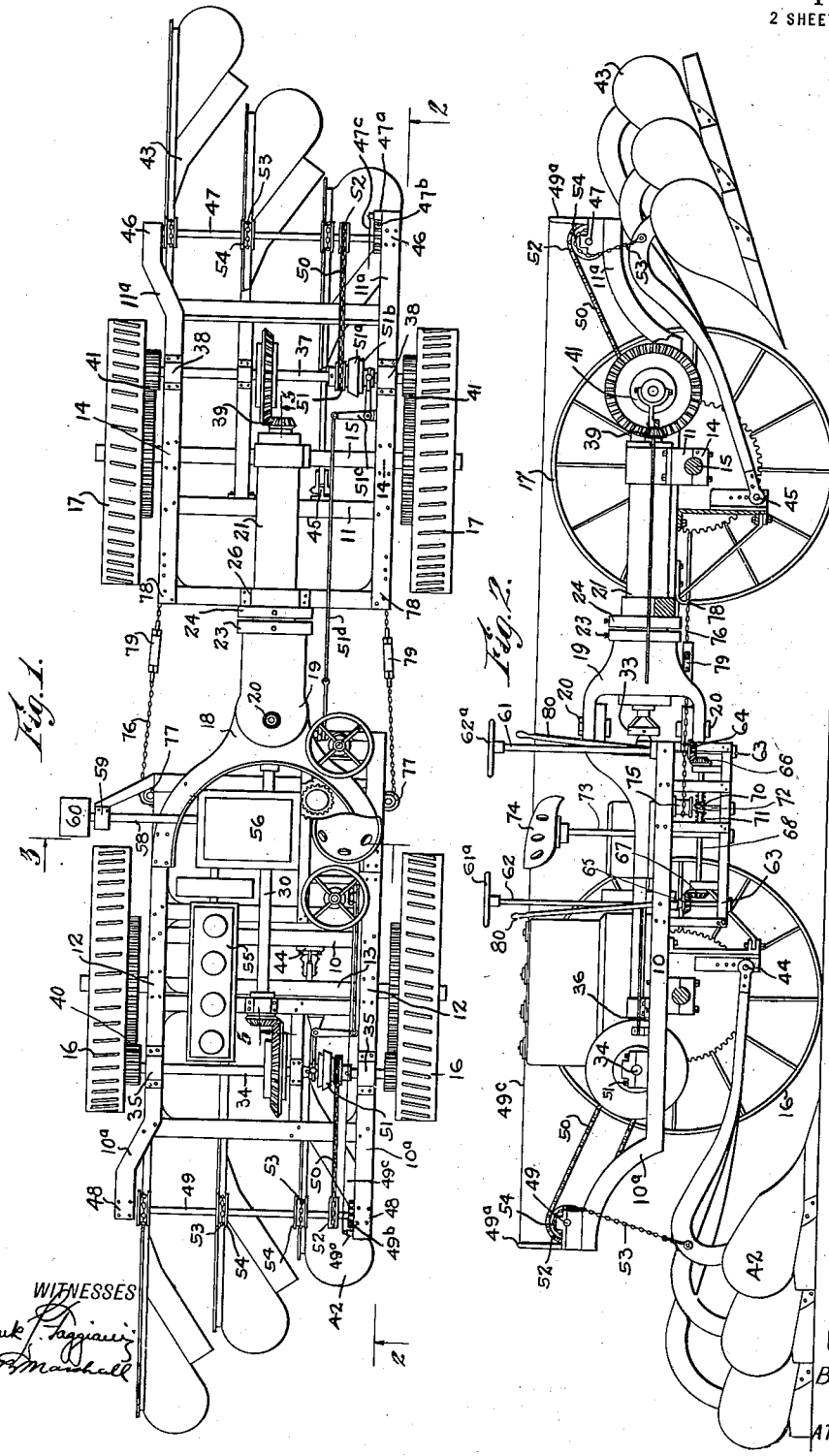

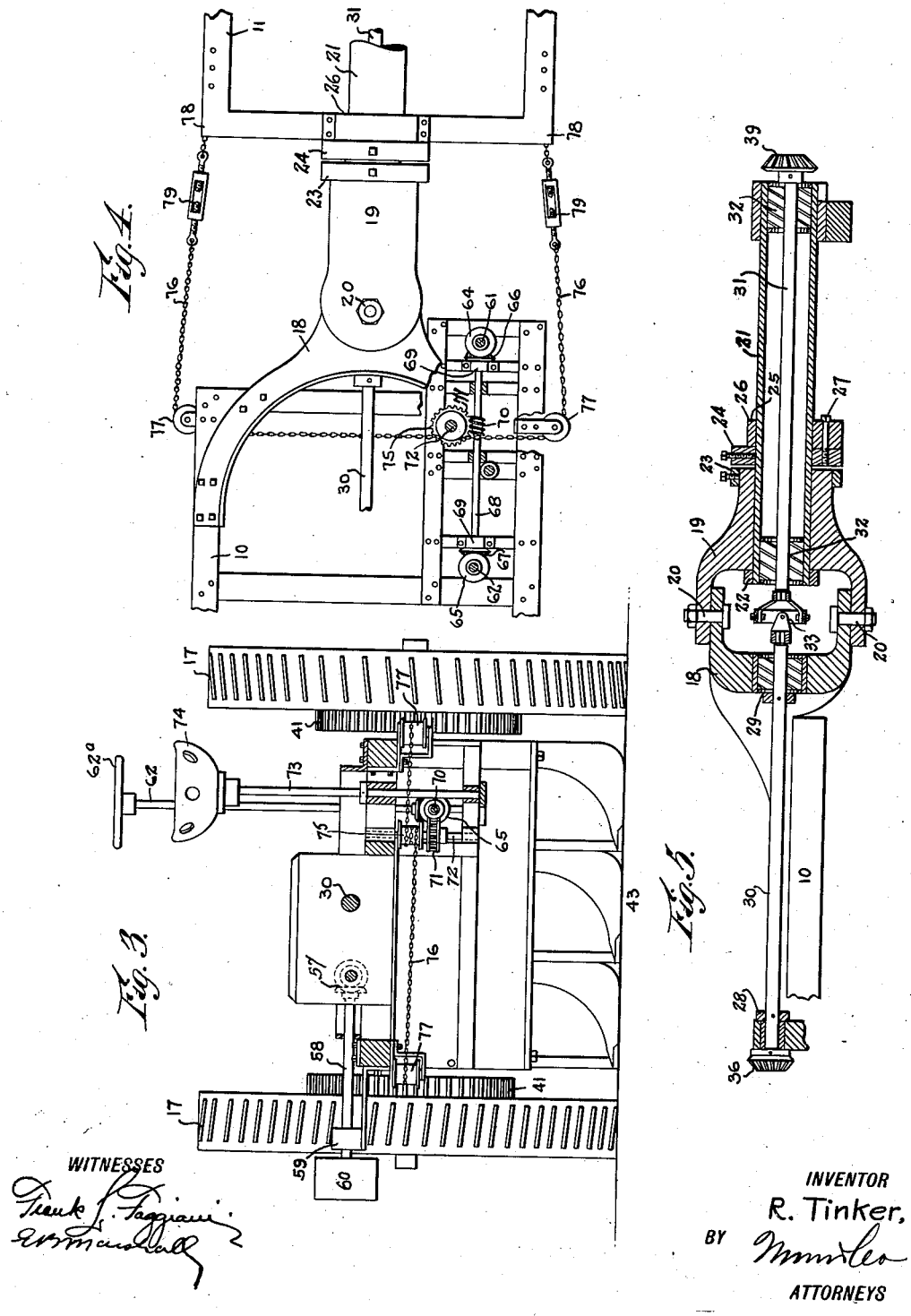

RALPH TINKER, OF LITTLE YORK, ILLINOIS.

STEERING MEANS FOR TRACTORS AND OTHER VEHICLES.

1,353,192. Specification of Letters Patent. Patented Sept. 21, 1920.

Original application filed July 25, 1917, Serial No. 182,690. Divided and this application filed February 18, 1919. Serial No. 277,726.

*To all whom it may concern:*

Be it known that I, RALPH TINKER, a citizen of the United States, and a resident of Little York, in the county of Warren and State of Illinois, have invented a new and Improved Steering Means for Tractors and other Vehicles, of which the following is a full, clear, and exact description.

My invention has for its object to provide improved means for steering tractors and other vehicles. My improvement has particular reference to the steering of tractors where two frames are pivoted together on a vertical axis, the adjacent corners of the coupled frames being drawn together on either side as desired, which causes a lateral movement of the coupled frames one relative to the other for steering purposes.

This application is a division of the application which was filed in the United States on July 25th, 1917, Serial No. 182,690, the Letters Patent on the said application were issued on March 4th, 1919, under No. 1295938.

In the drawings similar reference characters denote similar parts in all the views, in which Figure 1 is a plan view showing my tractor plow;

Fig. 2 is a view on the line 2—2 of Fig. 1;

Fig. 3 is an enlarged sectional view on the line 3—3 of Fig. 1;

Fig. 4 is an enlarged fragmentary view illustrating the steering mechanism; and

Fig. 5 is an enlarged sectional view on the line 5—5 of Fig. 1.

By referring to the drawings, it will be seen that two frames 10 and 11 are provided which are pivoted together on a vertical axis in a manner which I will shortly describe. One of the frames, preferably the frame 10, is provided with two vertically extending steering shafts 61 and 62, one spaced in front of the other, the steering shafts 61 and 62 being journaled in bearings 63. The steering shafts have steering wheels 61ª and 62ª. There is a bevel gear 64 on the shaft 61 and a bevel gear 65 on the shaft 62, the said bevel gears 64 and 65 meshing with gears 66 and 67 on the shaft 68 disposed longitudinally of the frame 10 and journaled in bearings 69. The said shaft 68 has a worm 70 which meshes with a worm wheel 71 on a vertical shaft 72. A pulley or sprocket wheel 75 is secured to the shaft 72 which is engaged by a chain 76 disposed around pulleys 77 on the frame 10. The ends of this chain 76 are secured at 78 to the sides of the frame 11, turnbuckles 79 being provided for tightening the chain 76.

Disposed between the shafts 61 and 62 there is journaled a post 73 having a seat 74, it being possible to rotate the post so that the operator may face the steering wheel 61ª or the steering wheel 62ª, as desired. In either case it is possible for the operator by turning the steering wheel in front of him to draw up the chain 76 at one side of the tractor for steering purposes.

The frame 10 has bearings 12 in which an axle 13 is journaled, the frame 11 having bearings 14 in which an axle 15 is journaled; traction wheels 16 being secured to the axle 13 and traction wheels 17 being secured to the axle 15. The frame 10 is provided with a yoke 18 at its center line, and the frame 11 is provided with a yoke 19 at its center line, the yokes 18 and 19 being pivoted together by bolts 20 which are in alinement. The yoke 19 is rotatably mounted on a sleeve 21, and is prevented from longitudinal movement relative to the sleeve 21 by collars 22 and 24 which are secured to the sleeve 21 by means of set screws, or in any other suitable manner. The collar 24 is mounted on the sleeve 21 and is secured to the sleeve by a set screw, the sleeve 21 passing through an opening 25 in a member 26 of the frame 11, the said member 26 being secured to the collar 24 by means of bolts 27. It will be understood that with this construction the frames 10 and 11 may move laterally one relative to the other, and it will be understood that one of the said frames may move on a horizontal longitudinally extending axis relatively to the other frame so that the tractor may readily pass over uneven ground, this being possible in view of the fact that the yoke 19 is permitted to rotate relatively to the sleeve 21 between the collars 22 and 24. A reinforcing collar 23 is mounted on the yoke 19 adjacent the collar 24 and is held in place by a set screw.

The frame 10 has a bearing 28, there being another bearing 29 in the yoke 18, the axis of these bearings 28 and 29 being in alinement and extending longitudinally of the frame 10. In the said bearings 28 and 29 a shaft 30 is journaled, there being a similar shaft 31 journaled in bearings 32 in the sleeve 21. The shafts 30 and 31 are connected by a universal joint 33 so that one of the shafts 30 and 31 may rotate the other shaft irrespective of the position of one of the frames 10 and 11 relatively to the other frame.

The shaft 30 is connected with a shaft 34 journaled in bearings 35 in the frame 10 by means of bevel gears 36, and the shaft 31 is connected with a shaft 37 journaled in bearings 38 in the frame 11 by means of bevel gears 39. The shaft 34 is connected with the axle 13 by gearing 40, and the shaft 37 is connected with the axle 15 by gearing 41.

At the outer end of the frame 10 there is disposed a set of plowshares 42, and at the outer end of the frame 11 there is disposed a similar set of plowshares 43, the set of plowshares 42 being pivoted at 44 to the frame 10, and the set of plowshares 43 being pivoted at 45 to the frame 11. Journaled in bearings 46 on members 11a of the frame 11 there is a shaft 47; and journaled in bearings 48 on members 10a of the frame 10 there is a shaft 49. The shaft 37 is connected with the shaft 47 by means of a sprocket chain 50 which is disposed around a sprocket wheel 51 on the shaft 37 and a sprocket wheel 52 on the shaft 47, the sprocket wheel 51 being mounted on a clutch member 51a which will rotate with the shaft 37 when it is engaged by its companion clutch member 51b keyed to the shaft 37. The clutch member 51b is actuated by a lever 51c which is controlled by a lanyard 51d. While the shafts 47 and 49 may each rotate in one direction to raise the plowshares, the said shafts are normally prevented from rotating in opposite directions by pawls 47a and 49a which engage ratchet wheels 47b and 49b secured to the shafts 47 and 49. The pawls 47a and 49a may be freed from the ratchet wheels 47b and 49b by the lanyards 47c and 49c. The shaft 49 is connected with the shaft 34 by a similar sprocket chain 50 and similar sprocket wheels 51 and 52, which will operate in a similar manner. The sets of plowshares 42 and 43 are connected with the shafts 49 and 47 by means of chains 53, which are secured to the plowshares and are disposed around pulleys 54 secured to the shafts 49 and 47.

It will be seen that with this construction, when the shafts 30 and 31 are rotated to drive the tractor in one direction, the plowshares at one end of the tractor may be lowered and the plowshares at the other end of the tractor may be raised, and that when the direction of rotation of the shafts 30 and 31 is reversed to drive the tractor in the opposite direction, the plowshares which have been raised may be lowered, and the plowshares which have been in contact with the ground may be raised to inoperative position. This may be done by throwing into operative position the clutch member 51b. On the frame 10, as illustrated in the drawings, there is mounted a motor 55 which is connected by means of gearing 56 with the shaft 30. The engine shaft is also preferably connected by means of gearing 57 with a shaft 58 journaled in bearings 59 in the frame 10, this shaft 58 being provided with a pulley 60 which may be used for a variety of purposes.

Having thus described my invention, I claim as new and desire to secure by Letters Patent:

1. A tractor plow having a longitudinally extending shaft, two vertical steering shafts one spaced in front of the other, means by which the vertical shafts may rotate the longitudinal shaft, a vertical post journaled in bearings between the shafts, a seat on the post, and means by which the tractor plow may be steered by the longitudinal shaft.

2. In a tractor plow, two frames one pivoted to the other, supporting wheels for the frames, a flexible member having ends spaced apart and secured to one of the frames, a drum rotatably mounted on a vertical axis around which the flexible member is disposed, a longitudinally extending shaft gearing connecting the shaft with the drum for rotating the latter, two vertical shafts one disposed in front of the other, gearing connecting the vertical and the longitudinal shafts, a vertical post disposed between the vertical shafts, and a seat mounted on the post.

3. In a tractor plow, two frames pivoted together, a drum rotatably mounted on one of the frames, a flexible member disposed around the drum, the flexible member being disposed around members of the last mentioned frame adjacent its outer sides, the terminals of the flexible member being secured to the other frame, two steering posts disposed one in front of the other, means connecting the steering posts with the drum for rotating the latter, and a seat disposed between the steering posts.

RALPH TINKER.